Aug. 3, 1965 C. D. KEITH ETAL 3,198,240
CATALYTIC OXIDATION UNIT AND RADIANT GAS BURNER
Filed Sept. 4, 1962
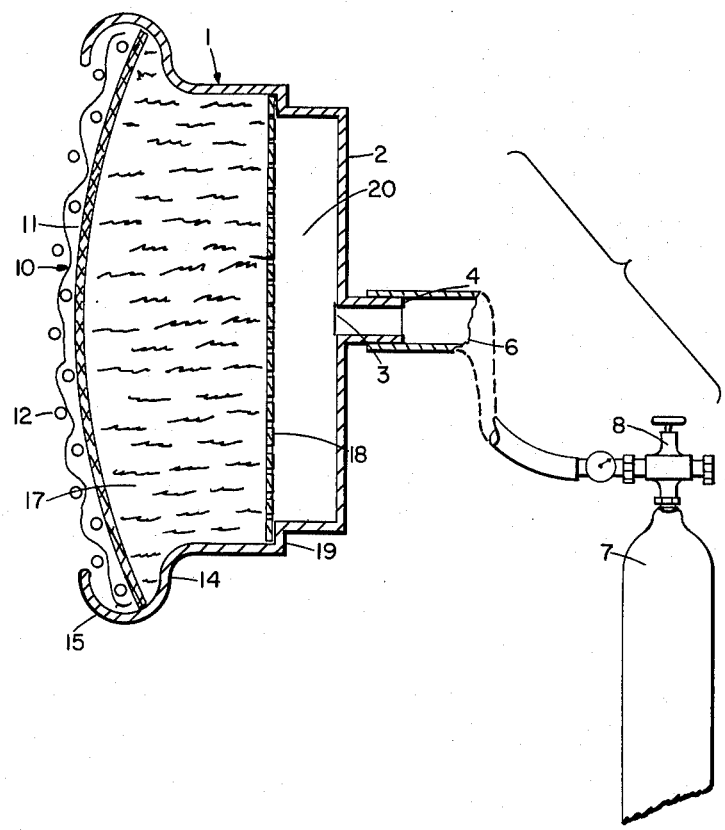
INVENTORS
CARL D. KEITH
GEORGE SOUSTRUZNIK
BY
ATTORNEYS

United States Patent Office 3,198,240
Patented Aug. 3, 1965

3,198,240
CATALYTIC OXIDATION UNIT AND RADIANT GAS BURNER
Carl D. Keith, Summit, and George Soustruznik, Caldwell, N.J., assignors to Engelhard Industries, Inc., Newark, N.J., a corporation of Delaware
Filed Sept. 4, 1962, Ser. No. 221,234
4 Claims. (Cl. 158—116)

The present invention relates to catalyst units for catalytic heaters and other catalytic oxidation apparatus.

In a catalytic heater a carbon-compound containing fuel gas, such as propane, is mixed with air in the presence of a catalytically active metal such as platinum, palladium, rhodium or alloys thereof. The catalyst causes the fuel gas to oxidize and produce heat without flame. Heaters operating on this principle of flameless combustion provide safe, compact and economical space heaters. They are used as portable space heaters for automobiles in drive-in theaters for example. They are particularly desirable for use on boats and in other places where the provision of heat without flame is an important safety feature. Another use for which they are well suited is to provide the uniform heat required in the operation of thermal electrical generators.

This same principle of flameless combustion is also useful for oxidizing undesirable carbon-compound containing gases such as exhaust gases from automobiles.

In such catalytic oxidation devices the catalyst may be in the form of finely divided particles of the catalytically active metal deposited on a porous inert thermally-resistant cloth such as asbestos cloth. Asbestos cloth is particularly suited as a support for the catalyst since the particles of the catalytic material adhere to it well, however, other materials such as fibrous silicia-alumina are also useful.

In operation the fuel gas is conducted to one side of the catalyst unit and passed through to the other side which is open to the air. Combustion takes place over the face of the unit and is initiated by preheating the unit. Preheating may be accomplished by lighting the fuel gas coming through the catalyst unit. When the catalyst unit is hot enough the catalytic action starts and the flame goes out.

Catalytic heaters of the above type operate on a variety of volatile hydrocarbons as well as alcohols. Propane, acetylene and volatilized benzene and naphtha are examples of hydrocarbons which may be used as fuel for catalytic heaters.

Heretofore the catalyst units have been formed by depositing the particles of the catalytically active metal directly on the asbestos cloth or other support material. This is usually accomplished by dissolving a thermally reducible compound of the catalytically active metal in a suitable solvent, impregnating the support material with the dissolved compound and then heating to precipitate the metal on the support material. Platinum is the metal usually used and chlorplatinic acid ($H_2PtCl_6$) dissolved in deionized water is one compound which is used for depositing the platnium on the support.

In practice when the fuel gas has a high content of propylene or other olefin these catalyst units in which the catalytic metal is deposited directly on the support material have been difficult to start and do not produce heat efficiently.

The present invention provides an improved catalyst unit which will start as well and heat as efficiently using fuel gas with a high olefin content as the previous catalyst units do with propane fuel gas which they are particularly adapted to use. In fact in tests the catalyst unit of this invention started and operated with highly satisfactory efficiency actually using propylene as the fuel gas.

In accordance with our invention, the catalyst unit consists of particles of catalytically active metal, preferably platinum, adhered to finely divided particles of alumina with particles of the platinum-alumina mixture deposited on a support material, which, in the preferred embodiment, is asbestos cloth. This is accomplished by dissolving a thermally reducible compound of the catalytic metal in a solvent, mixing it thoroughly with alumina, and heating the mixture to reduce the metal and precipitate particles of the metal on the alumina. The mixture which is then in the form of a dry powder is mixed with water to make a thin slurry which is sprayed on the support material. After drying the catalyst unit is ready for use. The alumina is generally an activated alumina and must be of fine particle size so that it will adhere firmly to the asbestos cloth. Thus the particles are desirably less than 20 microns in size and preferably less than 10 microns in size.

Another advantage of the metal-alumina catalyst material of our invention is that it makes it possible to provide an efficient catalyst unit using commercial grade asbestos cloth as the support material. Asbestos cloth is a good support material because it is inert and thermally resistant and the catalyst material, whether it be particles of metal alone or the metal-alumina mixture of this invention, adheres to it well. It would be desirable to be able to use a commercial grade asbestos cloth such as "Johns Manville" DE–808 because it is less expensive than an A.S.T.M. grade such as "AAAA." However, in practice it has been found that when a commercial grade was used as the support for the previous forms of catalytic metal catalysts, the catalyst tended to fail prematurely. We believe the premature failures are due to impurities in the commercial grade and particularly to the presence of iron which seems to deactivate the catalytic metal. When commercial grade asbestos is used as the support material for the metal-alumina form of catalyst of our invention, the catalyst consistently remains active for a service life in excess of 2500 hours, which is a superior performance to that of catalysts prepared in accordance with copending application Serial No. 778,079 filed December 4, 1958, now abandoned and replaced by a continuation-in-part application Serial No. 262,818 filed March 1, 1963.

It is a principal object of the present invention to provide an improved catalytic oxidation unit which will operate efficiently with fuels containing a high concentration of olefins.

An additional object is to provide an efficient catalyst unit in which the catalytic material is supported on a commercial grade asbestos.

Further objects and advantages will be apparent from the following description and accompanying drawing which is partly in section and which shows a catalytic heater embodying the present invention.

Referring now to the drawing, the catalytic heater 1 comprises a generally dish shaped housing 2 open at the front and having at the back a gas entry port 3 around which is a rearwardly extending flange 4 to which is connected a hose or tube 6 to a cylinder 7 of fuel gas. The flow of fuel gas from the cylinder 7 is controlled by a conventional reduction valve 8.

Across the open front of the heater housing 2 is a catalyst unit 10 comprising asbestos cloth 11 on which the catalyst material, subsequently described in detail, is deposited. The cloth 11 is supported in position by rigid metal open work screen 12 in front. The edges of the catalyst unit 10 are against a shoulder portion 14 in the side wall of the housing 2 and the catalyst unit is held in place by the edge 15 of the housing side wall which is bent over the edge of the catalyst unit 10 as shown.

A protective wire grille, not shown, is normally attached over the front of the housing 2 and spaced from the catalyst unit 10 so that people will not inadvertently come in contact with the front of the catalyst unit 10 and burn themselves.

In back of the catalyst unit 10 and inside the housing 2 is a batt 17 of a gas permeable, inert thermal resistant material such as mineral wool. The batt 17 is against the back of the catalyst unit 10 and held in place by a perforated retaining plate 18 which is inside the housing 2 and held in place by the pressure of the batt 17 which holds it against a shoulder portion 19 in the side wall of the housing 2. The area between the retaining plate 18 and the back wall of the housing 2 defines a gas diffusion chamber 20.

Fuel gas from the cylinder 7 enters the housing 2 through the entry port 3. It diffuses in the chamber 20 and passes through perforations in the retaining plate 18 and through the batt 17. The batt 17 further diffuses the fuel which then passes through the cloth 11 to the front of the catalyst unit 10 where it comes in contact with the surrounding air and is oxidized to produce flameless heat by the action of the catalyst supported on the cloth 11. This flameless oxidation or combustion of the fuel gas is initiated by preheating the catalyst unit 10.

The catalyst unit 10 of this invention and the method of preparing it for use will now be described.

The catalyst unit 10 comprises asbestos cloth 11 which is the support for the catalytic material of this invention comprising particles of alumina on which particles of a catalytically active metal from the group consisting of platinum, palladium and rhodium have been precipitated. The preferred embodiment of the invention is hereafter described with reference to platinum, but it will be kept in mind that palladium or rhodium or mixtures of these are equally suitable. Also it will be understood that support materials other than asbestos cloth may be used but asbestos having proved the most satisfactory is preferred.

The asbestos cloth 11 may be woven or felted, but the woven is preferred since it is of a more uniform thickness and density and provides a plurality of uniformly spaced equal size small openings through the cloth which facilitates the passage of the fuel gas.

Moreover the uniformly spaced openings through woven cloth, permit the fuel gas to pass through and come in contact with the catalyst in substantially equal amounts and at equal pressure over the entire face of the catalyst unit 10. This of course is desirable for even production of heat across the whole face of the unit.

The cloth 11 used in the embodiment described herein is "Johns Manville" type DE-808 cloth which is a commercial grade. This cloth ordinarily contains cotton— generally about 25–30% which is removed by burning. The cloth is heated to a temperature at which the cotton and any other organic material is burned out, but not so high that the mechanical strength of the cloth is impaired. In practice, the cloth is heated in a furnace at 375° C. for about 15 minutes.

To provide a catalyst unit in accordance with this invention platinum is precipitated on alumina and the platinum-alumina mixture is deposited on the cloth 11. The platinum is of course the active catalytic material and the amount of platinum per square foot of cloth for an effective catalyst unit may vary widely. For example, as little as 0.05 gram of platinum per square foot will work satisfactorily and as much platinum as can be loaded onto the cloth will also work. In practice we have found that a catalyst unit having from 0.25–2.0 grams of platinum per square foot of support surface provides an efficient catalyst unit with a good service life in excess of 2500 hours. The amount of platinum used in excess of about 0.05 gram per square foot of support is largely determined by economics and desired service life of the catalyst unit. Increasing the amount of platinum above about 0.25 gram per square foot of support does not seem to increase the efficiency of the catalyst unit appreciably but would tend to increase its service life. As previously mentioned, palladium or rhodium may be used instead of platinum in which case the weights discussed above are still applicable.

The platinum is precipitated on and adhered to finely divided alumina by mixing the alumina with a solution of a thermally reducible compound of the platinum (or palladium or rhodium) and heating the mixture until the compound is reduced and the mixture is dried to a powder consisting of particles of aluminum with particles of platinum adhered thereto.

In practice we prepare the alumina from finely divided alumina hydrate by calcination. The particles of alumina must be finely divided for satisfactory operation of the catalyst unit of this invention. Starting with particles of alumina hydrate less than 20 microns in size and preferably less than 10 microns produces the desired result. The alumina hydrate we use ("Alcoa" C-730 alumina hydrate powder) contains about 35% combined water and is calcined by heating in a furnace for 8 hours at 650° C. The particles of alumina are substantially the same size after calcination as before.

The ratio of platinum (or palladium or rhodium) to alumina for effective operation of the catalyst unit in accordance with this invention is from about 0.05–20% by weight of platinum to alumina and in practice we find a ratio of 1–6% platinum is the most practical and effective.

To precipitate the platinum on the alumina chloroplatinic acid ($H_2PtCl_6$) is dissolved in distilled or deionized water. The alumina is then thoroughly mixed into the solution after which the material is evaporated to dryness with mixing. The composite is then heated at about 450° C., fixing the platinum on the alumina.

The calcined platinum on alumina mixture is then stirred into distilled or deionized water to form a slurry. The thickness of the slurry depends on the method of application. A thin slurry is made which may be applied to the support material (cloth 11) by spraying, though the platinum on alumina slurry may also be applied by painting or dipping. With a slurry thin enough to pass through the slightly enlarged orifice of a "De Vilbiss" sprayer model No. 121 about 93 cc. of the slurry is sprayed on each square foot of cloth to have about 0.25–0.75 gram of platinum per square foot of cloth.

The slurry is sprayed on both sides of the cloth and then the cloth is rolled two or three times to provide good penetration and adhesion of the platinum on alumina particles to the cloth. After drying the impregnated cloth it is ready for use as the catalyst unit in a heater, such as the heater 1 described above, or other catalytic oxidation apparatus.

The above description is of a preferred embodiment of the invention and it will be understood that certain variations in structure, quantity and materials used may be made without departing from the spirit of the invention as set forth in the following claims.

We claim:

1. A catalyst unit for use in catalytic oxidation apparatus comprising a support structure of asbestos cloth, which is porous to permit passage of a fuel gas therethrough, and a catalytic material deposited on the cloth, said catalytic material comprising particles of active alumina less than 20 microns in size and a catalytically active metal from the group consisting of platinum, palladium and rhodium, said metal being precipitated on and fixed on the particles of alumina in a ratio of metal to alumina of 0.05–20% by weight, said catalytic material being deposited on said cloth in a concentration to provide from 0.05–2.0 grams of the catalytically active metal per square foot of cloth.

2. A catalytic unit as set forth in claim 1 in which the ratio of said metal to alumina is from 1–6% by weight.

3. A catalytic unit as set forth in claim 2 in which the catalytic material is deposited on the porous asbestos cloth in a concentration to provide from 0.25–2.0 grams of the catalytically active metal per square foot of cloth.

4. A catalytic heater comprising a housing open at the front and having an entry port through which fuel gas is introduced into the housing, and a catalyst unit across the front of said housing, said catalyst unit comprising a support structure of asbestos cloth, which is porous to permit passage of a fuel gas therethrough, and a catalytic material deposited on the cloth, said catalytic material comprising particles of active alumina less than 20 microns in size and a catalytically active metal from the group consisting of platinum, palladium and rhodium, said metal being precipitated on and fixed on the particles of alumina in a ratio of metal to alumina of 0.05–20% by weight, said catalytic material being deposited on said cloth in a concentration to provide from 0.05–2.0 grams of the catalytically active metal per square foot of cloth.

References Cited by the Examiner

UNITED STATES PATENTS

| | | | |
|---|---|---|---|
| 684,863 | 10/01 | Porter | 252—466 XR |
| 2,580,806 | 1/52 | Malina. | |
| 2,742,437 | 4/56 | Houdry. | |
| 2,759,897 | 8/56 | Haensel et al. | 252—466 XR |
| 2,814,599 | 11/57 | Lefrancois et al | 252—460 XR |
| 3,029,802 | 4/62 | Webster | 158—96 X |

JAMES W. WESTHAVER, *Primary Examiner.*

MORRIS O. WOLK, *Examiner.*